US008179535B2

(12) United States Patent
Martin et al.

(10) Patent No.: US 8,179,535 B2
(45) Date of Patent: May 15, 2012

(54) REMOTE SENSING OF UNDERWATER ACOUSTIC FIELDS

(75) Inventors: Barry John Martin, New South Wales (AU); John Chester Wendoloski, New South Wales (AU)

(73) Assignee: Commonwealth Scientific and Industrial Research Organisation Australia and Defence Science and Technology Organisation (AU)

( * ) Notice: Subject to any disclaimer, the term of this patent is extended or adjusted under 35 U.S.C. 154(b) by 621 days.

(21) Appl. No.: 12/300,533

(22) PCT Filed: May 10, 2007

(86) PCT No.: PCT/AU2007/000625
§ 371 (c)(1),
(2), (4) Date: Mar. 27, 2009

(87) PCT Pub. No.: WO2007/131264
PCT Pub. Date: Nov. 22, 2007

(65) Prior Publication Data
US 2010/0060901 A1    Mar. 11, 2010

(30) Foreign Application Priority Data

May 12, 2006  (AU) .............................. 2006902552

(51) Int. Cl.
*G01B 9/02*  (2006.01)
*G01D 5/32*  (2006.01)
*G01H 1/00*  (2006.01)
*G01H 9/00*  (2006.01)
*G01N 9/18*  (2006.01)

(52) U.S. Cl. ......................................... 356/502; 73/657
(58) Field of Classification Search .................. 356/502; 73/655–657; 367/15, 131
See application file for complete search history.

(56) References Cited

U.S. PATENT DOCUMENTS

| 3,688,666 | A | * | 9/1972 | Tuttle et al. ........................ 396/7 |
| 4,843,597 | A | * | 6/1989 | Gjessing et al. ................. 367/15 |
| 6,147,636 | A |   | 11/2000 | Gershenson |
| 6,385,131 | B1 |   | 5/2002 | Woodsum et al. |
| 6,396,770 | B1 |   | 5/2002 | Carey et al. |
| 6,836,285 | B1 | * | 12/2004 | Lubard et al. ..................... 348/31 |
| 6,859,419 | B1 | * | 2/2005 | Blackmon et al. ............. 367/134 |
| 7,283,426 | B2 | * | 10/2007 | Grasso ........................... 367/149 |
| 2006/0083111 | A1 | * | 4/2006 | Grasso ........................... 367/131 |
| 2010/0060901 | A1 | * | 3/2010 | Martin et al. .................. 356/512 |

OTHER PUBLICATIONS

Derwent Abstract Accession No. 91-246562/34, DE 4004228 A (Mantel) Aug. 14, 1991.
International Search Report and Written Opinion for PCT Application No. PCT/AU2007/000625, 7 pages, Jul. 18, 2007.

* cited by examiner

*Primary Examiner* — Patrick J Connolly
(74) *Attorney, Agent, or Firm* — Brinks Hofer Gilson & Lione

(57) ABSTRACT

An acoustic field in a body of water is monitored using a coherent light field emitter applying a distributed light field across the surface of the water to be reflected, and a sensor is used to sense reflected components of the light field above the surface and to provide a signal representing information in the reflected light and related to movements in the water and caused by the acoustic field. The signal is provided from an interferometry technique and useable to derive information on the underwater acoustic field in a useful form.

28 Claims, 4 Drawing Sheets

REMOTE SENSING OF UNDERWATER ACOUSTIC FIELDS

This application is a filing under 35 U.S.C. §371 of International Patent Application PCT/AU2007/000625, filed May 10, 2007, which claims priority to Australian application no. AU 2006902552, filed May 12, 2006.

The present invention relates to remote sensing of underwater acoustic fields and more particularly is concerned with sensing from above a body of water utilising an optical technique operating in the infra-red, visible or ultra-violet portions of the spectrum. In this specification, the terms "optical" and "light" are used to refer to these portions of the spectrum.

The present invention broadly involves applying a coherent light field emitted from above a body of water and onto its surface with a distribution of the light across the surface for reflection to a remote sensing location above the surface with a reflected light field carrying information relating to movements in the body of water resulting from an acoustic field within the body of water, whereby by using interferometry the reflected light field may be analysed to provide information on the underwater acoustic field.

The invention manifests itself in methods of operations and apparatus established for implementing such methods, including signal processing to provide information on acoustic fields in a body of water.

In general the light field can be of any suitable frequency. Important embodiments utilise a laser to generate a coherent light field which is controlled to provide a suitable spatial distribution of light onto the body of water for a suitable duration in time. Thus, the distribution of the light causes reflection to the sensing location from a multitude of points simultaneously in the presence of waves and ripples. Small scale perturbations of the surface of the body of water caused by an acoustic field can thereby be detected, monitored and analysed, despite the usual presence of the waves and ripples.

The phrase "a multitude of points", in the previous paragraph, relates to and includes a multitude of facets, which are small regions of the water surface that specularly reflect or that scatter light to the sensing location. Individual fragments of light reflected from such facets to the sensing location are commonly termed "glints". The reflected field in toto typically comprises a multitude of such glints.

In general embodiments use a spatial distribution or dimension at least equal to a capillary-gravity wave length present at the air-water interface. For example, that dimension may be 1 cm at a minimum and typically in the order of tens of centimeters to meters or more.

Embodiments can use a dimension for the spatial distribution at least equal to the wave length of an underwater acoustic field impinging on the water-air interface from below the interface.

The invention may be implemented in embodiments in which interference is used for a portion of the emitted light field with the reflected light field. Alternatively, interference can utilise a portion of the reflected light field interfering with itself. Yet another approach can be to use interferometry where the reflected light field interferes with a portion of the emitted light field modified to have the same shape wavefront as the reflected light field. Embodiments utilising this approach may use a photorefractive medium to cause a portion of the emitted light field to be modified to have the same shape wavefront as the reflected light field and interfere with the reflected light field.

Embodiments may use a fibre optic array to assist in making the wavefronts of said portion of the emitted light field and reflected light field the same shape. A further development can be to use the system in any one of the forms described above in conjunction with a source of underwater sound whereby the system is adapted to detect or characterise underwater objects by monitoring reflections of the underwater sound from underwater objects.

One approach is to generate remotely above the water electromagnetic radiation (such as in the infrared, visible or ultraviolet region) in a form to interact with the body of water to generate the underwater sound required in the method.

When the invention is applied using interference of a portion of the emitted light field with the reflected light field, a frequency shift may be introduced between these fields. Furthermore, in-phase and quadrature demodulation of the interfered light fields may be used.

Embodiments of the invention may employ wide aperture optical imaging interferometry. This may be accomplished as follows:

A coherent light source, such as a laser, with power set such as to illuminate an area on the water surface with the required electromagnetic intensity, is used to simultaneously illuminate the area. The reflected light is collected by receiving optics and may be:

a) combined and interfered linearly with a reference light field formed with part of the emitted light, which is split out, before the light is directed to the surface, or b) combined and interfered linearly with itself (such as in a Fabry Perot interferometer), or c) interfered with a reference light field created using a portion of the emitted light (which is often split out before the light is directed to the surface) that undergoes a non-linear electromagnetic interaction with the reflected light for example, using the photorefractive effect.

In any of these processes the spatial relationship of the points of light reflected from the surface must be preserved by the interferometry and any other processing of the light. This allows the formation of an interference image, of the surface. Such images are collected in time.

To obtain surface movement information, such as displacement (and velocities) as a function of time, the collected images must be demodulated. To accomplish accurate demodulation of the points within the interference image, the following techniques can be used:

The reference light field may be elliptically polarized (circular polarization being a special case) with respect to the light reflected from the surface by using a waveplate. In this case, when the light reflected from the surface interferes with the reference light field, the modulations of the intensities of orthogonal polarization components in the interfered light are phase shifted with respect to each other by some angle, typically 90 degrees. This effect may also be achieved where the light reflected from the surface is elliptically polarized with respect to the reference light field. Such interferometric techniques are well known by optics practitioners. The two (typically orthogonal) polarization components are said to contain "in-phase" and "quadrature" components of the phase modulated interfered light. This procedure allows the required phase shifts in the return signal to be measured using in-phase and quadrature demodulation, without requiring multiple sets of mixing electronics for each element of the image. This is of significant practical importance for high resolution image processing.

The interference images may be collected in one embodiment by a suitable photo-detection process, which converts the images into an array of electronic signals (or channels). Such a process may involve an array of photo-diodes or a CCD array. The individual electronic signals (in this embodiment) may then be electronically processed to separate out the phase shifts as required to form the measurement (which may include an electronically displayed image), of the surface movements. If the above "in-phase" and "quadrature" technique was used to create corresponding interference images; then "in-phase" and "quadrature" digital demodulation of the corresponding electronic signals may be used. This would normally involve analog-to-digital conversion of the electronic signals and digital signal processing. The technique of "in-phase" and "quadrature" demodulation is well known in the field of interferometry. From the measurement of the water surface movements, smaller acoustic vibrations can be obtained. These are typically separated out by signal processing techniques, such as the Fast Fourier Transform. From the acoustic vibrations, properties of the underwater acoustic field causing the acoustic vibrations may be derived.

A principal feature of such an embodiment is that the simultaneous collection of a large number of independent signals (possibly electronic, as above), representing the surface movements over the illuminated region, provides an inherent redundancy for cases where some signals are not, at least by themselves; of sufficient quality to allow useful measurements to be made. In some cases, some individual signals may be discarded depending on signal quality and allowed processing time. In other cases, aggregates of some signals may be formed to increase the signal to noise ratio.

This method and system for making such measurements may be used on its own or combined with another system (remote or otherwise) for generating underwater acoustic waves. In either case, such a method and system for measuring the surface movements may be used in the detection, location, or other characterization, of underwater objects or structures. Alternatively, such measurements may be used to receive signals transmitted from underwater entities or objects and form part of an above surface to below surface (and vice versa) communication system.

Embodiments of the invention will now be given by way of example only with reference to the accompanying drawings of which:

Figure 1:
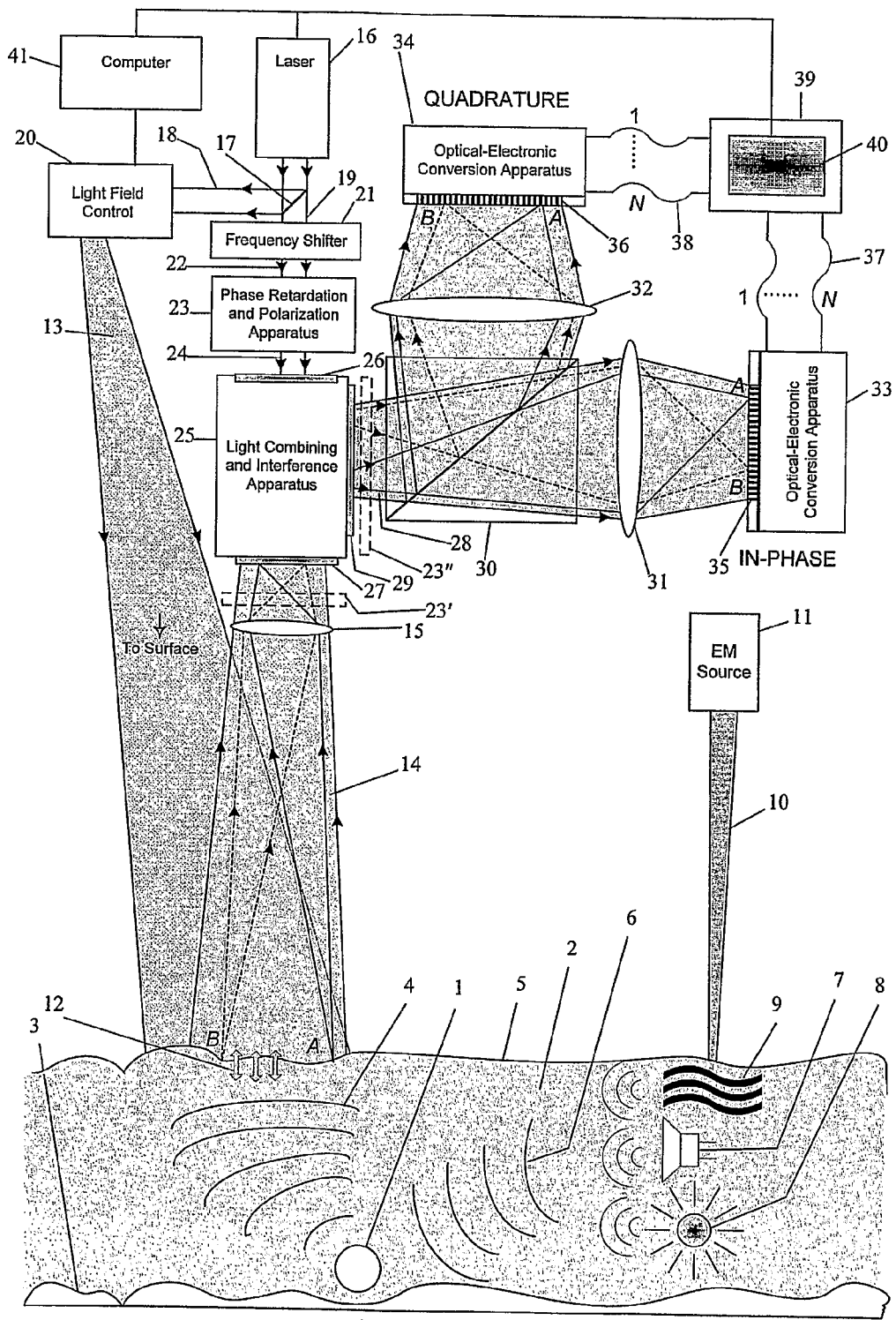
FIG. 1 is a representation of a system embodying the invention and working above the surface of a body of water for sensing an underwater acoustic field propagated to the water surface, possibly from a generic underwater object, or the bed of the body of water.

The system generally will be described firstly with reference to FIG. 1. FIG. 1 illustrates a generic object 1, which is located within a body of water 2. In this embodiment, an underwater acoustic field 4 propagates from the object 1, or the bed 3 of the body of water 2, to the surface 5 of the body of water 2. The acoustic field 4 may be internally generated by the object 1 or bed 3, or caused by mechanical interaction (e.g. reflection and diffraction) of an incident acoustic field 6 with the object 1 or bed 3. The acoustic field 6 may be generated by another source such as an underwater loudspeaker 7 or an underwater explosive 8. Alternatively the underwater acoustic field 6 may be generated by an opto-acoustic interaction 9 of an optical, or other electromagnetic, field 10 with the water body 2. The source 11 of the optical, or other electromagnetic, field 10 may be located above the surface 5 of the body of water 2.

In alternative embodiments, the acoustic field 4 may be present in the water due to other means not related to the object 1, or the bed 3. These are not shown. A large number of well known naturally and non-naturally occurring sources of underwater sound exist and the acoustic field 4 may be generated by any such source.

When the underwater acoustic field 4 impinges on the surface 5 of the body of water 2, it will cause an acoustic locally normal surface movement 12 of the surface 5. (The term 'locally normal' is used to indicate a direction locally perpendicular to the surface, which is not generally flat.)

The surface 5 will generally be disturbed and in motion, typically in the form of water waves (e.g. gravity-capillary waves). Water surface movements caused by typical water waves are usually many orders of magnitude larger in amplitude than typical water surface movements due to underwater acoustic fields that are impinging or can be made to impinge on the surface. In general, the water surface movement may be the combination of both acoustic and non-acoustic (e.g. water wave) movements.

To measure the water surface movements, including the acoustic locally normal (i.e. perpendicular) surface movement 12, a coherent field of emitted light 13, which in this embodiment is generated by a laser 16 (having a wavelength in the infrared, visible or ultraviolet range), is directed to the surface 5, remotely from above the surface. This may, for example, be from an aircraft or helicopter, but is not limited to these. The laser 16 may incorporate common optical devices such as polarizers and lenses (not explicitly shown) to facilitate the production of light with the required properties, such as polarization and focus. The spatial and temporal characteristics of the field of light 13, for instance its spatial extent and time duration, are chosen to be such that a sufficient region of the surface 5 is simultaneously illuminated; so that sufficient returned light comprising the reflected light field 14, reflected from the surface 5, may be received by collecting optics 15 so that instantaneous (or near instantaneous) optical interference images 35 and 36 of the surface may be made.

By collecting these images which change in time and comparing them, phase shifts in the reflected light field 14, as a function of time, at points within the images may be obtained. The time rate of change of these phase shifts correspond to shifts in the frequency of the reflected light field 14. (Such frequency shifts are often referred to as 'Doppler shifts').

These phase shifts allow a measurement of water surface movements to be made. When specular reflections dominate, as will be assumed in this embodiment, this measurement of the water surface movements will be predominately of locally normal surface movements. From the measurement of the locally normal water surface movements, a measurement of the acoustic locally normal surface movement 12 may be obtained. The reflected light field 14 from the water surface 5 (being generally disturbed and in motion) would typically be comprised of a multitude of glints as described earlier in this document.

Coherent light is generated by a laser 16 and then split by a beam-splitter 17 into a first beam 18 and a second beam 19. Beam 18 is directed towards the light field control optics 20, which may include optical components commonly used by practitioners in optical measurements. The components may include, but are not limited to: lenses, mirrors, polarizers, acousto-optical components, beam choppers, Pockel cells and wave plates or Babinet-Soleil compensators (the latter two listed devices being to rotate the polarization of the light). The components may have the capacity for electromechanical actuation as appropriate. These are arranged to assist in the production of the coherent field of emitted light 13, with the said spatial and temporal characteristics.

The embodiment in FIG. 1 uses a hybrid homodyne-heterodyne interferometric principle, in combination with in-phase and quadrature demodulation. Although this embodiment may be operated strictly as a homodyne system, it includes a device 21 for shifting the frequency of the second light beam 19 by a frequency $f_s$. The device 21 may consist of acousto-optic modulators, such as Bragg cells or an adjustable velocity, vibrating mirror. The device 21 may be switched off if pure homodyne operation is required. While switched on, the device 21 will frequency shift light affected by it to ensure the total frequency shift composed of the addition of the frequency $f_s$ and the Doppler shifts in the reflected light field 14, maintains the same algebraic sign. This is advantageous in demodulating signals from difficult measurement environments, such as a rapidly fluctuating water surface. This device may also be used in a feedback mode to ensure that the transmitted and reflected light always have the same phase relationship.

The second beam 19 is directed towards the frequency shifter device 21 and emerges as a frequency shifted beam 22 which is then directed toward a phase retardation and polarization device 23 to circularly (or elliptically) polarize the light, i.e. to lag the phase between orthogonal (e.g. horizontal and vertical) polarization components by 90° (or other specified angle). Alternative embodiments may position the phase retardation and polarization device 23 between the bottom image plane 27 (of the light combining and interference device 25) and the collecting optics 15. This is shown as a dashed rectangle labelled 23' in FIG. 1. In this case the reflected light field 14, rather than the second beam 19, will be circularly (or elliptically) polarized. Another alternative is to position the phase retardation and polarization device 23 between the exit plane 29 and the splitting prism 30 and introduce the required circular (or elliptical) polarization effect by acting on the combined and interfered light field 28. This is shown as a dashed rectangle labelled 23" in FIG. 1. Components used in the phase retardation and polarization device 23 (e.g. wave plates, Babinet-Soleil compensators and polarizers) may also be distributed, as required, amongst the original and other two listed alternative positions (shown at 23, 23' and 23"), to achieve the required effect. Further still, components in the light field control optics 20 (e.g. wave plates, Babinet-Soleil compensators and polarizers) may also be used to achieve the required effect, by circularly or elliptically polarizing the emitted light 13. This process of circularly or elliptically polarizing the light (i.e. by creating a phase lag between orthogonal polarization components of the light) will be used later to assist in extracting information related to the acoustic locally normal surface movements 12 from the reflected light field 14.

The light in beam 24 emanating from device 21, possibly via device 23 as per the specific embodiment, is directed to a light combining and interference device 25 (entering through a top image plane 26). Here the light is combined and interfered with phase shifted, reflected light field 14, emerging from the collecting optics 15 (possibly via device 23' as per the specific embodiment) and entering device 25 through a bottom image plane 27. The device 25 matches (to some degree) wavefronts between the light in beam 24 and the reflected light field 14. There are several embodiments for apparatus 25, which are illustrated in FIG. 2-FIG. 5. It should be noted that the apparatus in FIG. 5 is appropriate to embodiments where the required circular or elliptical polarization is performed on the reflected light field 14 or the combined and interfered light field 28 as described in the previous paragraph (i.e. involving the alternative positions 23' and 23"). As required by the specific embodiment, parts (e.g. orthogonal polarization components) of the combined and interfered light field 28 may be interfered with each other by apparatus downstream, in the light path, from device 25 (e.g. by the wide field of view polarizing beam splitting prism 30). The following description of the system operations will refer to the first embodiment listed in the previous paragraph for the phase retardation and polarization device 23. The substance of this description, however, is unchanged for the other embodiments involving the alternative positions 23' and 23", as the net effect in each case is to eventually generate combined and interfered light with orthogonal polarization components whose intensities bear a quadrature (sine-cosine) phase relationship consistent with Equation 1 and Equation 2 given below.

A description of the system operations will now be given. Consider the same polarization components of small approximately planar parts of matched wavefronts in beam 24 and the reflected light field 14. Let one polarization component, of the said part of the wavefront in beam 24 have amplitude $E_0^\|$ and the 90° phase-lagged orthogonal polarization component in beam 24 have amplitude $E_0^\perp$. Let the corresponding polarization components of the part of the wavefront in the reflected light field 14 have respective amplitudes $E_1^\|$ and $E_1^\perp$ (N.B. the reflected light field is assumed to be effectively linearly polarized in this embodiment). The intensity of each polarization component of the interfered wavefronts are then given by:

$$I^\| = (E_0^\|)^2 + (E_1^\|)^2 + 2E_0^\| E_1^\| \sin\left[2\pi f_s t + \frac{4\pi}{\lambda}u(t) + \Delta\phi^\|\right] \quad \text{Equation 1}$$

$$I^\perp = (E_0^\perp)^2 + (E_1^\perp)^2 + 2E_0^\perp E_1^\perp \cos\left[2\pi f_s t + \frac{4\pi}{\lambda}u(t) + \Delta\phi^\perp\right] \quad \text{Equation 2}$$

where $\lambda$ is the wavelength of the coherent light generated by the laser 16, t is time, and u(t) is the locally normal water surface displacement, which includes the acoustic locally normal surface movement 12. The symbols $\Delta\phi^\|$ and $\Delta\phi^\perp$ represent static (or slowly varying) phase shifts (not including the introduced 90° phase-lag) between the said parts of light beam 24 and the reflected light field 14, for each polarization component. These phase shifts are defined to be consistent with the trigonometric representations in Equation 1 and Equation 2, where the introduced 90° phase-lag is manifested by the sine and cosine functions appearing in the equations.

A combined and interfered light field 28, emerging from an exit plane 29 of the light combining and interference device 25 is then directed toward a wide field of view polarizing beam splitting prism 30. Light of one polarization is directed to imaging lens 31 and the orthogonal polarization is directed toward the lens 32. The light emerging from lenses 31 and 32 are then imaged onto optical-electronic conversion devices 33 and 34 respectively. These devices may consist of arrays of photodiodes in one embodiment or CCD (Charge Coupled Device) arrays in another embodiment.

Two representative image points are shown on the water surface as A and B. These points are also shown imaged on to the optically sensitive surfaces of the optical-electronic conversion devices 33 and 34, where they are again labelled A and B. The points remain distinct and the relative order of the points is preserved through the optical path. The points A and B are representative points of light within a continuum of such points, which form the optical interference images 35 and 36, which are then used in the measurement of the locally normal water surface movements. The method of forming the measurement in this embodiment is as follows:

The optical-electronic conversion devices 33 and 34 convert the optical interference images 35 and 36, formed on their optically sensitive surfaces to two sets of electronic signals 37 and 38, representing the intensity of the interfered light. The total numbers of electronic signals, in the sets of signals 37 and 38, are denoted each as N (as per FIG. 1). N.B. the number N represents the total number of signals formed, resulting from the optical-electronic conversion of the two-dimensional images 35 and 36. The number N is analogous to the number of pixels in a common digital photographic image. A multi-channel signal recording, processing and display device 39, simultaneously, digitally samples each of the N electronic signals, in each set, as required. The N electronic signals, in each set, are processed with a digital signal processor incorporated in device 39. This may be done as follows:

The set of signals 38 are nominally in phase quadrature (i.e. 90 degrees out of phase) with the set of signals 37. The quadrature in this embodiment is accomplished, as described above, by using the phase retardation and polarization device 23 to lag the phase between orthogonal polarization components of the light.

The optics and signal processing are arranged so that the $(E_0^{\|})^2+(E_1^{\|})^2$ and the $(E_0^{\perp})^2+(E_1^{\perp})^2$ terms in Equation 1 and Equation 2 are filtered out or measured, and so that $E_0^{\|}E_1^{\|}/(E_0^{\perp}E_1^{\perp})$ is measured or effectively unity. The optics and signal processing are also arranged so that the difference between $\Delta\phi^{\|}$ and $\Delta\phi^{\perp}$ is effectively zero or measured. In this case, with suitable processing, digital signals of the following form may be produced:

$$S_I = \sin[U(t)]$$
and
$$S_Q = \cos[U(t)].$$

Equation 3

Equation 4

Where,

Equation 5

$$U(t) = 2\pi f_s t + \frac{4\pi}{\lambda}u(t).$$

These digital signals are then further processed as follows:

The term U(t) is found using a quadrant sensitive arctangent function and phase unwrapping the result (that is removing phase discontinuities caused by the arctangent function by adding or subtracting integer multiples of $2\pi$). This may be accomplished by forming the expression:

$$U(t) = \arctan\left[\frac{S_I}{S_Q}\right]$$

Equation 6 and then using a phase unwrapping algorithm. The results are then digitally filtered to produce the locally normal surface displacement u(t). The displacement u(t) will generally have components due to the water surface motion (i.e. gravity-capillary and other water waves) as well as that due to the acoustic locally normal surface movement 12. The acoustic component of the displacement due to the movement 12, which will be labelled $u_a(t)$, is usually much smaller than u(t) and may be separated from u(t) by digital filtering, which may include a Fast Fourier Transform but is not limited to this. Other techniques known in the field of digital signal processing may be applied.

The resulting set of N signals obtained from the processing described above, comprises a measurement of the acoustic locally normal surface movement at a set of different points on the surface. This measurement may be displayed on the display screen 40 of device 39. The N signals and any measurements derived from them may also be recorded by the device 39. The acoustic locally normal surface displacement $u_a(t)$, at each position s on the water surface, may be written symbolically as $u_a(t,s)$. The symbol s is a vector to a point on the surface in a suitable coordinate system. In some cases, some of the N signals may be discarded depending on signal quality and allowed processing time. In other cases, aggregates of some of the N signals may be formed to increase the signal to noise ratio. These processes may be included in the functions of the multi-channel signal recording, processing and display device 39. A principal feature of this system is that the simultaneous collection of multiple signals to form the measurement of the acoustic locally normal surface movement, provides an inherent redundancy for cases where some signals were not created with sufficient received light to (by themselves) allow useful measurements of $u_a(t,s)$ to be made.

The acoustic locally normal surface velocity $v_a(t,s)$ of the surface 5 is related to the acoustic locally normal surface displacement $u_a(t,s)$ by differentiation with respect to time:

$$v_a(t, s) = \frac{du_a(t, s)}{dt}.$$

Equation 7

And the acoustic pressure $p(t,x_s)$ at a point (or points) $x_s$ fractionally below the surface 5 may be related to the acoustic locally normal surface velocity by:

$$\rho\frac{\partial v_a(t, s)}{\partial t} = -\frac{\partial p(t, x_s)}{\partial n}$$

Equation 8 where $\partial/\partial n$ indicates the partial derivative in the direction of the local normal to the surface 5, and $\rho$ is the density of the water in the water body 2. Using well known assumptions in underwater acoustics, such as a pressure release condition at an air-surface boundary, and other assumptions about the acoustic field 4 (such as that it is composed of one or more plane waves incident upon the surface 5), it is possible to characterise the underwater acoustic field 4 from a measurement of the acoustic locally normal surface displacement $u_a(t,s)$. That is, to use $u_a(t,s)$ to infer the acoustic pressure as a function of space and time, i.e. p(t,x), at points x within the water body 2. This in turn, by methods well known in underwater acoustics, allows acoustical and other physical properties and characteristics of the object 1, or the bed 3 of the body of water to be inferred from $u_a(t,s)$. This in turn, may allow the detection, determination of location, or other characterization of the object 1, or the bed 3. If acoustic signals containing information are being transmitted from object 1, the measurement of the acoustic locally normal surface displacement $u_a(t,s)$ may be used to read these signals as part of a above surface to below surface communication system. The computer 41 is used to synchronise the operations of the light field control optics 20, the laser 16 and the multi-channel signal recording, processing and display device 39.

Figure 2:
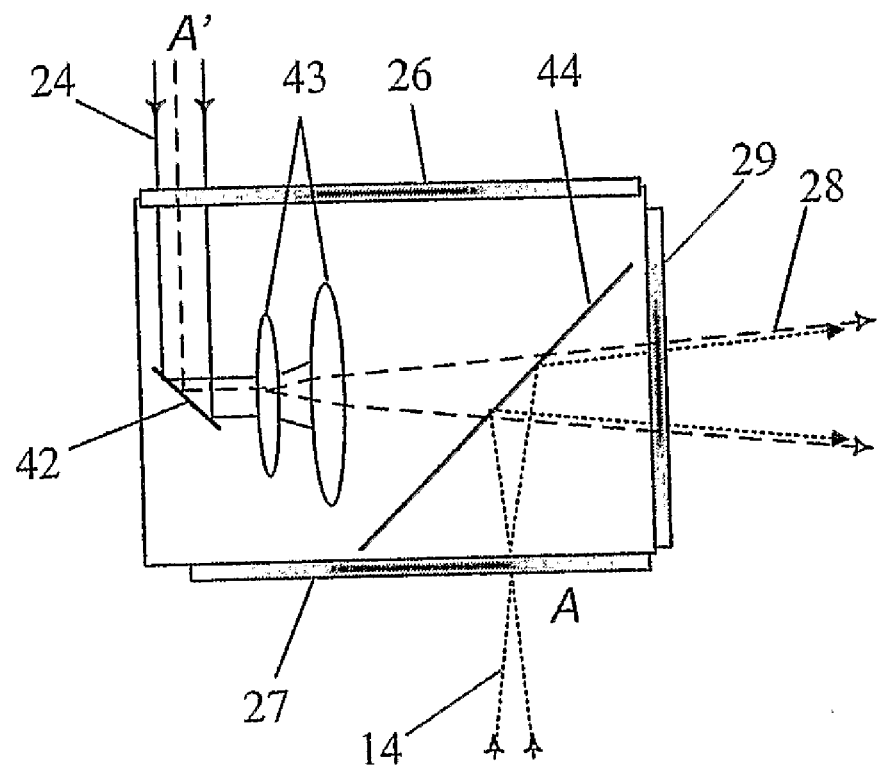
FIG. 2 illustrates schematically a first form of device for light combining and interference for use in the embodiment.

With reference to FIG. 2-FIG. 5, there are illustrated four embodiments of the light combining and interference device 25. The embodiment of FIG. 2 shows beam 24, assumed to be a plane wave, entering from the top image plane 26 and the reflected light field 14 imaged (by the collecting optics 15) onto the bottom image plane 27. Beam 24 is then directed by a mirror 42 to a system of lenses 43 designed to match, to some extent, its wavefront to the shape of the wavefront of the reflected light field 14, caused by the spherical divergence of the light 14 from points on the surface. Representative points labelled A and A' are shown. The point A corresponds to the representative point A in FIG. 1. The light field emanating from point A' in the beam 24 will have its wavefront matched to parts of the reflected light field 14 emanating from the point A on the surface 5. A light combiner 44 (which may be a partially silvered mirror, cube or other appropriate optical component with a suitably wide field-of-view) is used to combine and interfere the matched wavefronts from beam 24 and the reflected light field 14. The combined and interfered light field 28 exits the device 25 through the exit plane 29.

Figure 3:
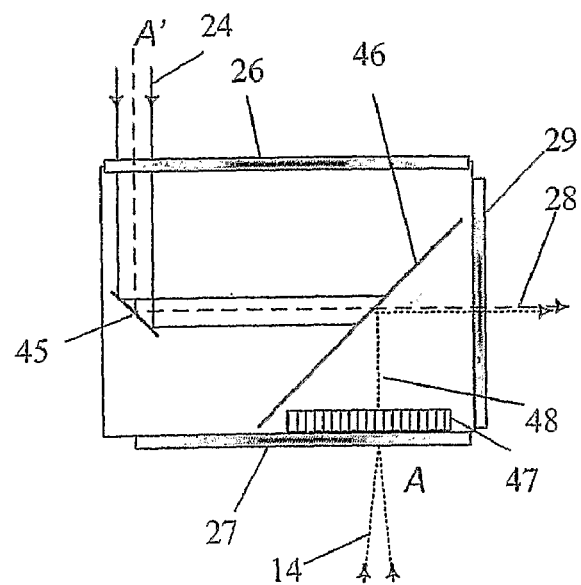
FIG. 3 is a representation of a second form of device for light combining and interference.

The embodiment of FIG. 3 has a beam 24, assumed to be a plane wave, entering from the top image plane 26 and the reflected light field 14 imaged (by the collecting optics 15) onto the bottom image plane 27. Beam 24 is then directed by a mirror 45 and then to a light combiner 46. The reflected light field 14 (again, assumed to be affected by spherical divergence) is focused onto and effectively collimated by a fibre optic bundle 47 and associated optics (not shown) to convert the shape of the wavefront to a plane wave, while at the same time preserving the image formed on the bottom image plane 27. The system ensuring that points of light imaged onto image plane 27 maintain their spatial relationship with each other in the collimated light 48 emerging from the fibre optic bundle 47. Beam 24 is a plane wave and, therefore, will have its wavefront matched to the collimated light 48. Representative points labelled A and A' are shown. The point A corresponds to the representative point A in FIG. 1. The light emanating from point A' in the beam 24 will have its wavefront matched to parts of the reflected light field 14 emanating from the point A on the surface 5. The collimated light 48 is directed to the light combiner 46, where it is combined and interfered with the plane wavefronts from beam 24. The combined and interfered light field 28 exits the device 25 through the exit plane 29.

Figure 4:
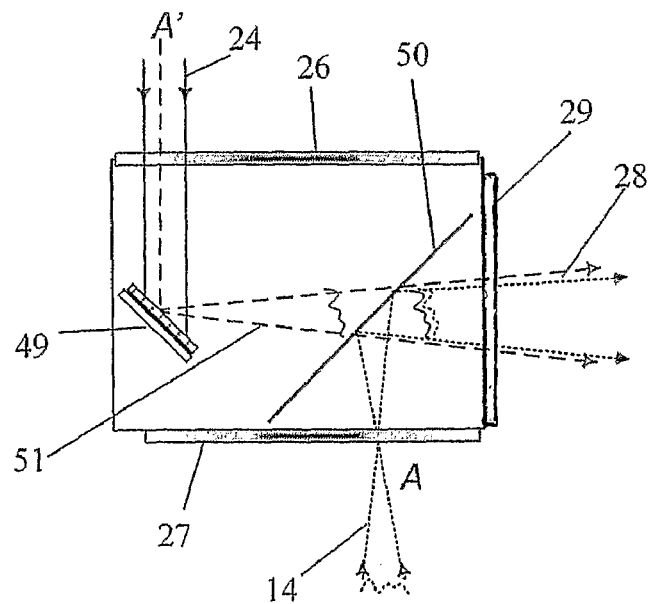
FIG. 4 is a representation of a third form of device for light combining and interference.
Figure 5:
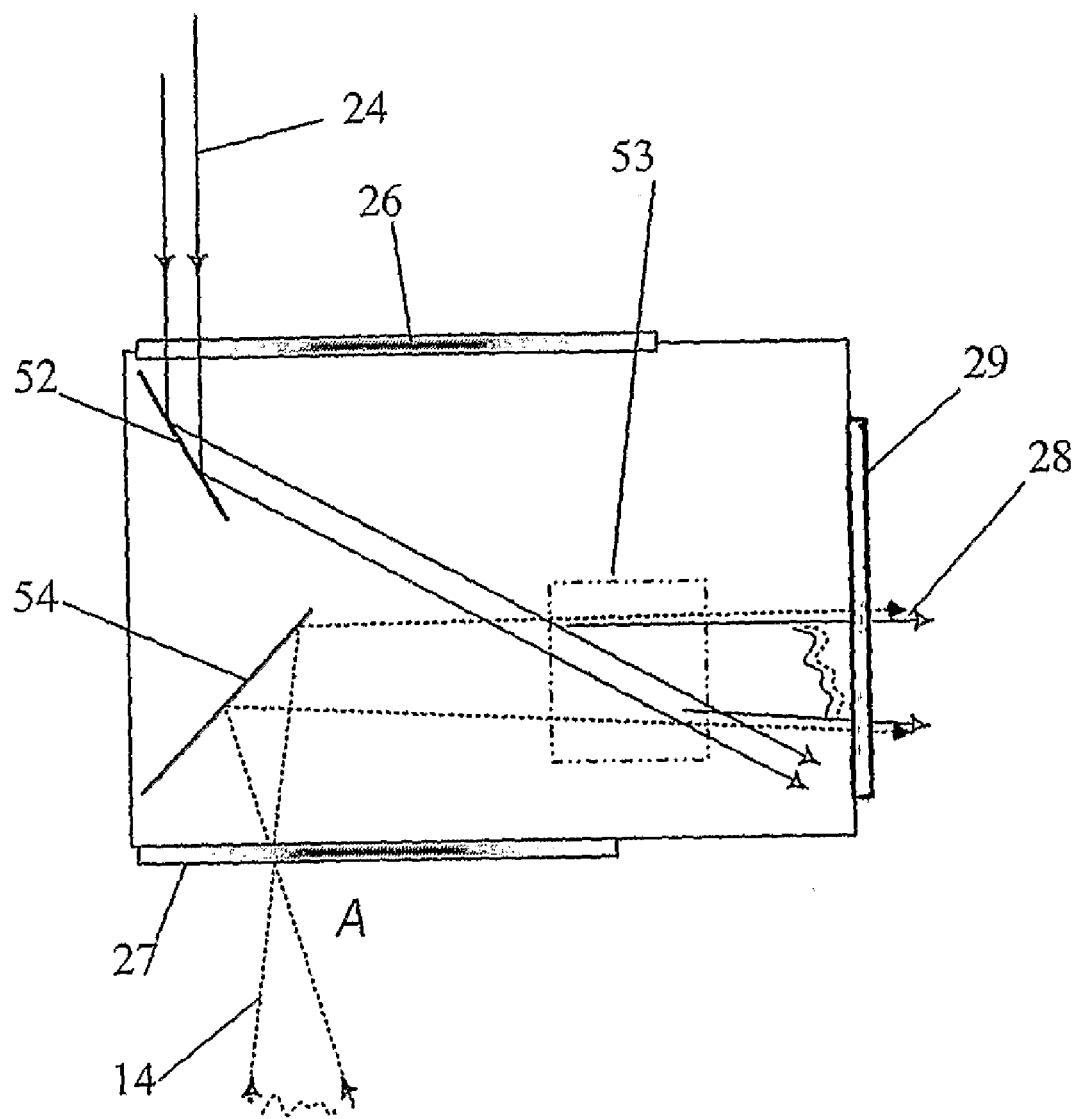
FIG. 5 is a representation of a fourth form of device for light combining and interference.

FIG. 4 shows beam 24, assumed to be a plane wave, entering from the top image plane 26 and the reflected light field 14 imaged (by the collecting optics 15) onto the bottom image plane 27. Beam 24 is then directed to a deformable mirror 49 and then to a light combiner 50. The deformable mirror is composed of many adjustable facets, which may be displaced to form an uneven mirror surface, causing relative phase shifts in any light reflecting from the said mirror. The phase shifts are set to be such as to cause the wavefront of the light field 51 emerging from the mirror 49 to have its wavefront matched to the shape of the wavefronts of the reflected light field 14. This technique may deal with phase distortions other than (and as well as) those caused by a spherical wavefront. The operation of the deformable mirror 49 may be directed by a computer or other control apparatus, often in conjunction with a wavefront sensor such as a Hartmann sensor (these are not shown). Representative points labelled A and A' are shown. The point A corresponds to the representative point A in FIG. 1. The light emanating from point A' in the beam 24 will have its wavefront matched to parts of the reflected light field 14 emanating from the point A on the surface 5. The light field 51 is directed to the light combiner 50, where it is combined and interfered with the reflected light field 14. The combined and interfered light field 28 exits the device 25 through the exit plane 29.

FIG. 5 shows beam 24, assumed to be a plane wave, entering from the top image plane 26 and the reflected light field 14 imaged (by the collecting optics 15) onto the bottom image plane 27. Beam 24 is then directed via a mirror 52 to a photorefractive medium 53. The reflected light field 14 also passes via a mirror 54 through the photorefractive medium 53 at the required angle to beam 24. In this embodiment, the beam 24 acts as a "pump" beam, which, by the photorefractive effect, can be made to effectively generate a reference light field with identical wavefront to the reflected light field 14 (effectively "copying" the light 14). If the period of the acoustic disturbance is short compared to the time constant of the photorefractive effect, then the reference light field will interfere with the reflected light field 14. Vibrations with periods similar to or longer than the time constant of the photorefractive effect will not generate appreciable interference. Hence, this technique may also be used to filter out unwanted low frequency signals. Furthermore, it can deal with phase distortions other than (and as well as) those caused by a spherical wavefront. A representative point is labelled A which corresponds to the representative point A in FIG. 1. The components of the wavefront of the light 14 emanating from a point A on the surface 5 will, therefore, effectively combine and interfere with a reference light field (generated by beam 24 through the photorefractive effect), which contains identical wavefront components. The combined and interfered light field 28 exits the device 25 through the exit plane 29.

The invention claimed is:

1. A method of monitoring an acoustic field in a body of water comprising applying a coherent light field emitted from above a body of water and onto its surface with a distribution of the light across the surface for reflection to a remote sensing location above the surface with a reflected light field carrying information relating to movements in the body of water resulting from an acoustic field within the body of water, whereby by using interferometry the reflected light field may be analysed to provide information on the underwater acoustic field, wherein a spatial distribution of the coherent light field has a width or length equal to or greater than a capillary gravity wavelength present at the air-water interface.

2. The method as claimed in claim 1, wherein a laser is used to generate the light field with a control system providing the spatial distribution and a duration in time so that the light field is simultaneously reflected from a multitude of points, whereby perturbation of the surface of the body of water resulting from an acoustic field can be monitored.

3. The method as claimed in claim 1, wherein the spatial distribution is over at least 1 cm.

4. The method as claimed in claim 3, wherein the distribution is across a zone in the range 10 cm to 500 m width and length.

5. The method as claimed in claim 1, and including the step of using an interferometry technique is selected from the group consisting of:
    (a) a portion of the emitted light field is interfered with the reflected light field,
    (b) a portion of the reflected light field is interfered with itself, and
    (c) the reflected light field is interfered with a portion of the emitted light field modified to have the shape of its wavefront matched to the shape of the wavefront of the reflected light field.

6. The method as claimed in claim 1, and further using a source of underwater sound whereby the system is adapted to detect or characterise underwater objects by monitoring reflections of the underwater sound from underwater objects.

7. The method as claimed in claim 1, wherein a fibre optic array is used in combining and interfering a portion of the emitted light field and the reflected light field, to assist in making the wavefronts of said portion of the emitted light field and reflected light field sufficiently the same shape to maximise lateral fringe spacings in the interfered light fields.

8. The method as claimed in claim 1, wherein a relative frequency shift is introduced between the reflected light field and a portion of the emitted light field.

9. The method as claimed in claim 5, wherein optical interference images of the water surface are generated from one of the interfered light fields.

10. The method as claimed in claim 5, wherein in-phase and quadrature optical interference images are generated from orthogonal polarization components of one of the interfered light fields.

11. The method as claimed in claim 10, wherein the in-phase and quadrature optical interference images are converted to in-phase and quadrature digital electronic signals and numerically demodulated.

12. The method as claimed in claim 5, wherein the selected technique is option (c) and the portion of the emitted light field is modified using a deformable mirror.

13. The method as claimed in claim 5, wherein the selected technique is option (c) and a non-linear medium is used to modify a portion of the emitted light field to have the same shape wavefront as the reflected light field by using a non-linear electromagnetic interaction, between the emitted light field and the reflected light field.

14. The method as claimed in claim 13, wherein the non-linear medium is a photorefractive medium and the said non-linear electromagnetic interaction includes the photorefractive effect in the photorefractive medium.

15. The method as claimed in claim 1, and further comprising producing a sound signal in the body of water to ensonify an underwater object and thereby to cause a resultant acoustic signal to be propagated and reach the air-water interface and monitoring the resultant acoustic signal.

16. An apparatus for monitoring an acoustic field in a body of water comprising a coherent light field emitter for applying a distributed light field across the surface of the body of water, to be reflected, a sensor for sensing reflected components of the light field above the surface and providing a signal representing information in the reflected light related to movements in the body of the water, the signal being provided from an interferometry technique permits derivation of the information on the underwater acoustic field in a useful form, and a control system arranged to use information on a capillary gravity wavelength present at the air-water interface to cause a spatial distribution of the coherent light field to have a width or length at least equal to that wavelength.

17. The apparatus as claimed in claim 16 and including a laser to generate the light field, and a control system to provide spatial distribution over a duration of time whereby perturbation of the surface of the body of water resulting from an acoustic field in the body of water can be monitored from the light field as simultaneously reflected from a multitude of points.

18. The apparatus as claimed in claim 16, whereby the width or length is at least 1 cm.

19. The apparatus as claimed in claim 16, wherein the light field emitter distributes the light field over a zone of 10 cm to 500 m width and/or 10 cm to 500 m length.

20. The apparatus as claimed in claim 16, and including an interferometer adapted to use any one of:
  (a) a portion of the emitted light field interfered with the reflected light field,
  (b) a portion of the reflected light field interfered with itself, and
  (c) the reflected light field interfered with a portion of the emitted light field modified to have the shape of its wavefront matched to the shape of the wavefront of the reflected light field.

21. The apparatus as claimed in claim 16, and further comprising a generator for underwater sound, whereby the apparatus can monitor reflections of underwater sound from underwater objects.

22. The apparatus as claimed in claim 16 and further comprising a fibre optic array for combining and interfering a portion of the emitted light field and the reflected light field, to assist in making the wavefronts of said portion of the emitted light field and reflected light field sufficiently the same shape to maximise lateral fringe spacings in the interfered light fields.

23. The apparatus as claimed in claim 16, and including means for introducing a relative frequency shift between the reflected light field and a portion of the emitted light field.

24. The apparatus as claimed in claim 23, and including means for generating in-phase and quadrature optical interference images from orthogonal polarization components of one of the said interfered light fields.

25. The apparatus as claimed in claim 24, and including means for converting the interference images into digital electronic signals and numerically demodulating them.

26. The apparatus as claimed in claim 16 and including means for arranging for the reflected light field to be interfered with a portion of the emitted light field modified to have the shape of its wavefront matched to the shape of the wavefront of the reflected light field.

27. The apparatus as claimed in claim 16 and including means for arranging for the reflected light field to be interfered with a portion of the emitted light field modified to have the shape of its wavefront matched to the shape of the wavefront of the reflected light field, and further having a non-linear medium arranged to produce a non-linear electromagnetic interaction between the emitted light field and the reflected light field so as to modify a portion of the emitted light field whereby it has the same shape wavefront as the reflected light field.

28. The apparatus as claimed in claim 27, wherein the non-linear medium is photorefractive and the electromagnetic interaction includes the photorefractive effect in the photorefractive medium.

* * * * *